(12) United States Patent
Campey et al.

(10) Patent No.: US 9,730,372 B2
(45) Date of Patent: Aug. 15, 2017

(54) TURF TREATMENT

(75) Inventors: Richard John Campey, MacClesfield (GB); Simon Jonathan Gumbrill, Stockport (GB)

(73) Assignee: RICHARD CAMPEY LIMITED, MacClesfield, Cheshire (GB)

( * ) Notice: Subject to any disclaimer, the term of this patent is extended or adjusted under 35 U.S.C. 154(b) by 287 days.

(21) Appl. No.: 14/239,350

(22) PCT Filed: Aug. 23, 2012

(86) PCT No.: PCT/GB2012/000678
§ 371 (c)(1),
(2), (4) Date: May 30, 2014

(87) PCT Pub. No.: WO2013/027005
PCT Pub. Date: Feb. 28, 2013

(65) Prior Publication Data
US 2014/0261120 A1 Sep. 18, 2014

(30) Foreign Application Priority Data

Aug. 25, 2011 (GB) .................................. 1114723.8
Feb. 13, 2012 (GB) .................................. 1202448.5

(51) Int. Cl.
*A01B 45/02* (2006.01)
*A01B 49/06* (2006.01)

(52) U.S. Cl.
CPC ............ *A01B 45/026* (2013.01); *A01B 49/06* (2013.01)

(58) Field of Classification Search
CPC ....... A01B 45/026; A01B 45/02; A01B 45/00; A01B 49/06; A01B 49/04; A01B 49/00
See application file for complete search history.

(56) References Cited

U.S. PATENT DOCUMENTS

| 4,436,040 A | * | 3/1984 | Chumley | ............... A01B 49/06 111/130 |
| 5,027,592 A |  | 7/1991 | Wieneke | |
| 5,178,491 A | * | 1/1993 | Graves | ...................... B09C 1/10 166/246 |
| 5,489,317 A |  | 2/1996 | Bergevin | |
| 6,094,860 A |  | 8/2000 | Motz et al. | |
| 6,483,607 B1 |  | 11/2002 | Van de Capelle et al. | |

(Continued)

FOREIGN PATENT DOCUMENTS

| AU | 412721 | 4/1971 |
| AU | 583005 | 6/1989 |

(Continued)

OTHER PUBLICATIONS

Chinese Search Report.
(Continued)

*Primary Examiner* — Christopher J Novosad
(74) *Attorney, Agent, or Firm* — Dority & Manning, P.A.

(57) ABSTRACT

A method for the treatment of turf (11) comprising grass (12) growing in a matrix (15, 16) comprising removing matrix (15, 16) including any thatch and other infestation by blading (18) moving through the matrix (15, 16) to a predetermined depth (d). The method may be used to treat turf (11) reinforced with artificial grass (13). Equipment for carrying out the treatment comprises a bladed rotor (17) rotating about a horizontal axis.

9 Claims, 5 Drawing Sheets

(56) References Cited

U.S. PATENT DOCUMENTS

| | | |
|---|---|---|
| 7,337,601 B1 | 3/2008 | Coffin |
| 2004/0040725 A1 | 3/2004 | Stevens |
| 2004/0118096 A1 | 6/2004 | Michel |
| 2004/0168698 A1* | 9/2004 | Gueret ............ A46B 9/021 132/200 |

FOREIGN PATENT DOCUMENTS

| | | |
|---|---|---|
| CN | 86201220 | 1/1987 |
| CN | 1960625 | 5/2007 |
| CN | 201422240 | 3/2010 |
| DE | 2745667 | 4/1979 |
| DE | 19519165 | 7/1996 |
| EP | 0974255 | 1/2001 |
| EP | 1440616 | 7/2004 |
| EP | 1632120 | 3/2006 |
| FR | 2384430 | 10/1978 |
| FR | 2867943 | 9/2005 |
| FR | 2881917 | 8/2006 |
| GB | 1454900 | 11/1976 |
| GB | 1597122 | 9/1981 |
| GB | 2364497 | 1/2002 |
| SU | 1031416 | 7/1983 |
| WO | WO2006/076768 | 7/2006 |
| WO | WO2011/152719 | 12/2011 |

OTHER PUBLICATIONS

PCT/GB20120/00678 International Search Report and Written Opinion, dated Oct. 12, 2012, 9 pages.

GB Combined Search and Examination Report under Section 17 & 18(3), dated Dec. 13, 2011, 5 pages.

GB Combined Search and Examination Report under Section 17 & 18(3), dated Nov. 26, 2012, 6 pages.

* cited by examiner

TURF TREATMENT

CROSS REFERENCE TO RELATED APPLICATIONS

This application is the U.S. National Stage entry of International Application Number PCT/GB2012/000678 filed under the Patent Cooperation Treaty having a filing date of Aug. 23, 2012, which claims priority to GB Patent Application Serial Number 1114723.8 having a filing date of Aug. 25, 2011 and GB Patent Application Serial Number 1202448.5 having a filing date of Feb. 13, 2012.

This invention relates to turf treatment, more particularly to treatment of sports playing surfaces such as football, rugby and hockey pitches, and tennis courts which, during the course of a playing season, are subject to wear and tear and also suffer from a build-up of thatch, which is an accumulation of layers of partially decomposed leaves, stems and roots. Diseases and other blights including algae, moss, fungi, and slime mould can invade the turf, and may be made worse by the presence of thatch.

It is usually recommended that thatch be treated by mechanical thatching equipment, an operation usually referred to as scarification, but sometimes known as verti-cutting, although that term is also used for the process of cutting vertically into the turf using fine blades, sometimes known as turf grooming. It is recommended to carry out scarification in several treatments rather than attempting to remove all the thatch at once, but this is essentially because conventional scarifiers remove thatch in thin furrows, leaving 'ridges' of thatch between them, and so cannot remove all the thatch in one pass.

U.S. Pat. No. 6,094,860 discloses the use of artificial fibre reinforcement for grass turf areas in playing fields subject to heavy wear, and other patents and proprietary systems similarly involve the use of artificial fibre reinforcement.

"Desso® Grassmaster" is a turf reinforcement system in which artificial grass fibres are injected some 20 cm deep into a grass surface, projecting some 25 mm above the soil. The maintenance of this system, as regards mowing, verti-cutting and ventilating, is said to be no different from the maintenance of ordinary turf. Mowing, of course, must be carried out with the cutter height at or above the height of the artificial grass fibres, e.g. at 26 mm or more if the fibre height is 25 mm, otherwise they would be cut or pulled out.

The artificial grass fibres are injected into a matrix of sand, which of course has no nutritional value, and there is only a thin top layer of humus, if indeed any, so the natural grass needs to be treated with fertiliser more than it would if grown in deep soil. This exacerbates problems of disease and infestation, bearing in mind that about 97% of the turf is natural grass. The sand also, over the course of a playing season, compacts more than does the usual substrate of natural, unreinforced turf.

On this, or indeed any, turf, moreover, undesired grasses and weeds such as clover can be a problem. Clover is especially problematic on playing surfaces such as tennis courts, as it tends to be slippery. Weeds are usually treated with systemic herbicides, which take time to act and which may require several treatments over a space of weeks.

The present invention provides an improved method and apparatus for treating turf, including artificial grass-reinforced turf planted in a matrix of sand and/or soil.

The invention comprises a method for the treatment of turf comprising grass growing in a matrix comprising removing matrix including any thatch and other infestation by blading moving through the matrix to a predetermined depth d.

The depth d may be determined by sampling the matrix to establish the depth to which it needs to be removed. It may, of course, be estimated on the basis of a greenkeeper's knowledge and experience. lithe matrix is badly infected it may be removed to such a depth that all the grass growing in it is removed, so that fresh sand or other matrix material may be applied and the area reseeded. However, it may be sufficient, if the infection has not penetrated too deeply, to remove thatch and matrix down to a depth above that at which grass roots are found which may then regenerate without the need to reseed.

In some methods for reinforcing turf, artificial grass fibres are attached to a backing buried beneath the surface. U.S. Pat. No. 5,489,317 discloses a permanent backing; U.S. Pat. No. 6,094,860 discloses a biodegradable backing that may, however, remain in situ for two years or more. It will, of course, be important with such systems to ensure that the depth d is less than the depth at which the backing would be disturbed.

The thatch, grass and matrix may be lifted by a rotor rotated about a horizontal axis with teeth that may be extended below surface level. The Wading may be angled with respect to the rotor axis so that there is no or substantially no part of the length of the rotor that does not have blading at some part of its circumference, and the rotor is rotated at such speed, relative to the rate of traverse over the turf, that no or substantially no part of the turf is left untreated. The blading, and particularly the teeth, may be of some substantial thickness, e.g. 5-10 mm. The rotor may be rotated so that the blading moves forwardly through the matrix. The blading may be in the form of hooked teeth, with the hooks facing in the direction of travel.

Treatment by such a rotor, whilst it may appear drastic, leaves the matrix level and raked and in a state where it can be instantly re-seeded, possibly with the addition of fresh sand and/or soil.

While it may be surprising that such a rotor can be used to such effect on natural turf, it is even more surprising that it can be done on Desso Grassmaster® and other reinforced turf systems without adversely affecting the artificial grass fibres.

Even the regular substrate of natural turf can, after heavy use, such as a term is court after a tournament, can become compacted. The blading may be made robust enough to cut through such compacted substrate. Compacted sand, of course, will need such robustness and will have a more abrasive effect. The blading may be made wear-resistant as by being tipped with tungsten carbide or another carbide or other wear-resistant material. Blading so tipped can survive treating an area the size of a football pitch in one or even two passes without noticeable wear, so that the treatment is essentially uniform throughout without the need to change or dress blading during the treatment.

The invention also comprises equipment adapted for the treatment of turf reinforced with artificial grass fibres in a sand or other matrix by removing matrix to a depth d below the matrix level, comprising a horizontal rotor having blading having peripherally distributed teeth at least of length d, and drive means to traverse and rotate the rotor over the turf, characterised by blade height control means adapted to deploy the teeth up to a depth d below the matrix level.

The blades may exhibit a saw tooth profile. The teeth may be inclined to the direction of motion, and so dimensioned that there is no, or substantially no, part of the length of the rotor that does not have a tooth at some part of its circumference. The teeth may be sufficiently narrow, however, that the anchored artificial turf is simply deflected by passage of the teeth, and then springs back, without being removed or damaged. The blades may have tips reinforced against wear with, for example, tungsten or other carbide, and may be hooked.

A typical thickness for the blade is 10 mm, but thicknesses of between 5 and 15 mm will be found satisfactory. The teeth may be the same thickness as the blading and may be fashioned as if from a solid blade by removal of U-shaped portions and then twisting the tooth formations left thereby so that the leading edge of the blade is parallel to the rotor axis when mounted thereon, which means it will be square to the direction of its motion through the ground.

A rotor having a diameter of, say, 500 mm, with helical blading, may have twenty-four teeth on one complete turn of the helix, and may have four helices. A typical rotational speed for such a rotor would be 1000 rpm. Driving the rotor so that the blades move forward through the turf, the blade linear speed through the turf is about 25 metres per second plus, of course, the forward speed of the tractor, which, however, will be only of the order of one metre per second. As the blade advances one metre through the turf, the rotor will rotate some seventeen times, so one metre length of turf of blade width will be subject to the attentions effectively of four times seventeen teeth, or sixty eight teeth, or a blade will dig into the turf every three millimetres, effectively removing all the material intended to be removed.

A rotor such as this can remove all material to the desired depth in a single pass, or at most two passes.

The helical blade arrangement will push removed material to one side. A helical blade, rotated so that its ground engaging teeth move forward in the direction of tractor travel, will push the material to the driver's right or left, depending on the 'hand' of the helix. A conveyor can be mounted adjacent the end of the rotor towards which the material is pushed to accept the material and elevate it into a companion trailer, drawn by another tractor keeping station with the rotor.

An auger-type grass mower is known from EP0974225, which has a similar arrangement of blade for free cutting of grass, which is to say, cutting using the blades as knives, as opposed to cutting against a fixed blade, scissor-fashion For this purpose the blade is set to the desired height of cut and, if used on turf containing reinforcing artificial grass fibre, would be set to cut just above the height of the artificial grass fibres. The blades also have to rotate quickly, in order to cut the grass, rather than just bend it out of the way. The teeth of that mower are set to the side by bending the blades by approximately the thickness of the metal from which they are made, and the three front edges of the teeth act as cutting edges. They are said to have advantages over another free cutting blade arrangement in EP0328080 in that they further reduce the size of the clippings. By contrast, the teeth of the equipment of the present invention are not configured to cut grass, whether artificial or natural, but to lift thatch, matrix and natural grass from the turf, leaving artificial grass, if present, in situ.

The rotor may have double, triple or more helix blading. As in EP0974255, the blade may be made in segments for ease of construction and repair. Four segments can make up a complete turn of the helix A rotor may be made adaptable to different conditions by blading being readily removable and replaceable, so that it can have different densities of teeth. If so, then it would be desirable to have an even number of helices, say four, so that two could be removed, leaving two, so as not to unbalance the rotor.

The rotor may be mounted on a chassis adapted for mounting on or towing behind a tractor unit especially one of the kind used for turf treatment and comprising an arrangement for rotating the rotor. The chassis or tractor unit may carry blade height setting means, as well as a transmission to drive the rotor in rotation. The rotor may be associated with a collector for material lifted by the blading.

A method for treating turf, and one embodiment of turf treatment equipment according to the invention will now be described with reference to the accompanying drawings, in which.

Figure 1:
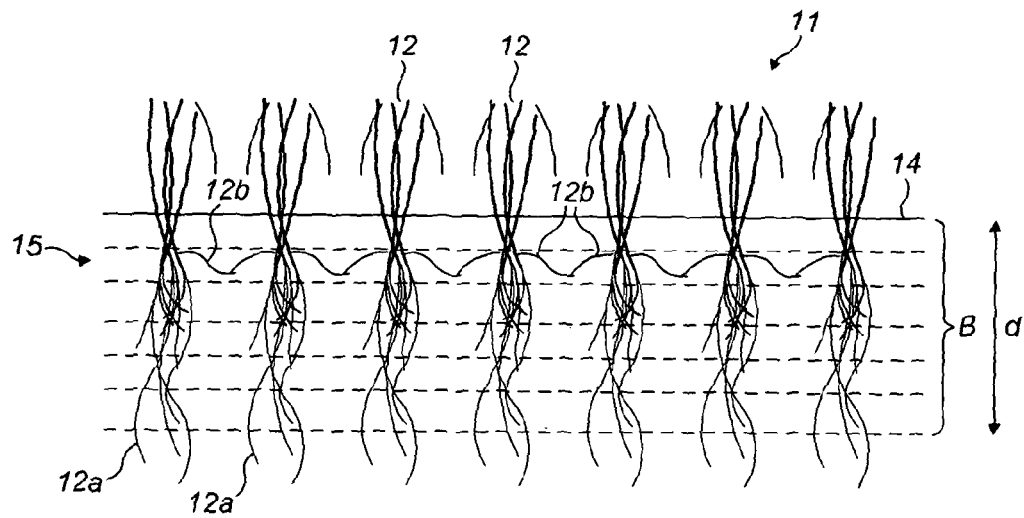
FIG. 1 is a cross section of turf.

The drawings illustrate a method for the treatment of turf 11, FIG. 1, comprising natural grass 12, sown, particularly in sports surfaces such as tennis courts and football and rugby pitches, in a matrix 15 of sand, silt and clay. The grass roots 12a are connected by rhizomes 12b. Over time and as a result of mowing and wear, the turf acquires an accumulation of dead grass known as 'thatch', and can also become infested with algae, moss, fungi, slime mould and other problems.

Figure 2:
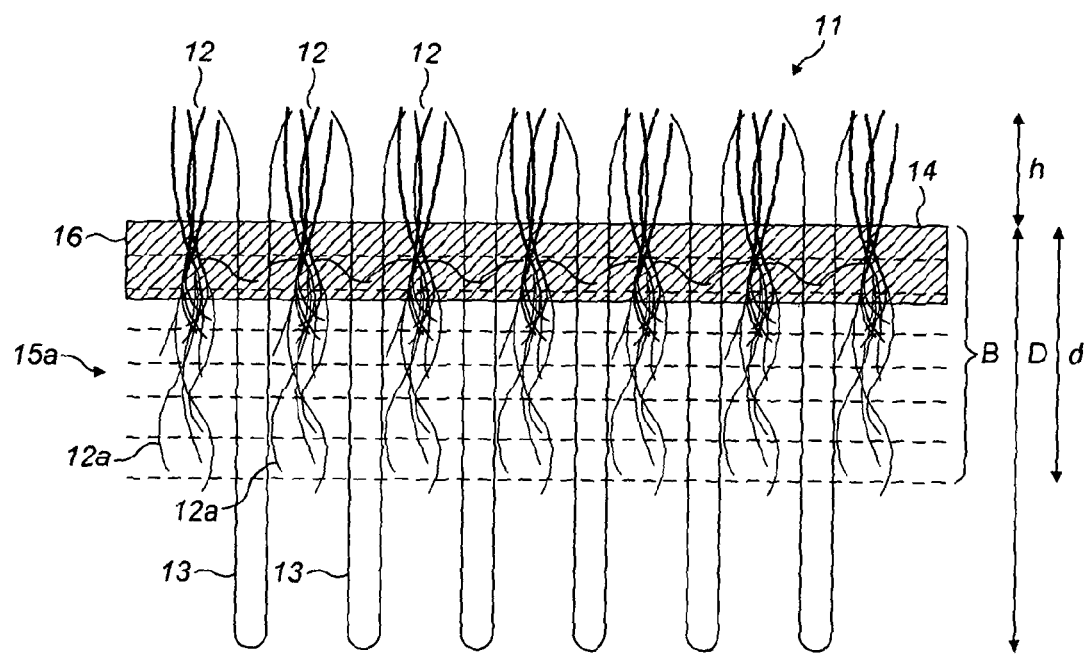
FIG. 2 is a cross section of artificial-grass reinforced turf.

FIG. 2 illustrates turf 11 like that shown in FIG. 1, which is reinforced with artificial grass fibres 13 which extend a given height h above turf level 14, typically 25 mm. This is usually sown in a matrix 15a of sand with just a thin upper layer 16 of humus, and can be more at risk of infestation through needing to be more heavily fertilised.

The artificial grass fibres 13 are injected a depth D, usually some 20 cm deep, through the humus 16 into the sand 15a.

An infected layer is shown in FIGS. 1 and 2 by the bracket B.

Figure 3:
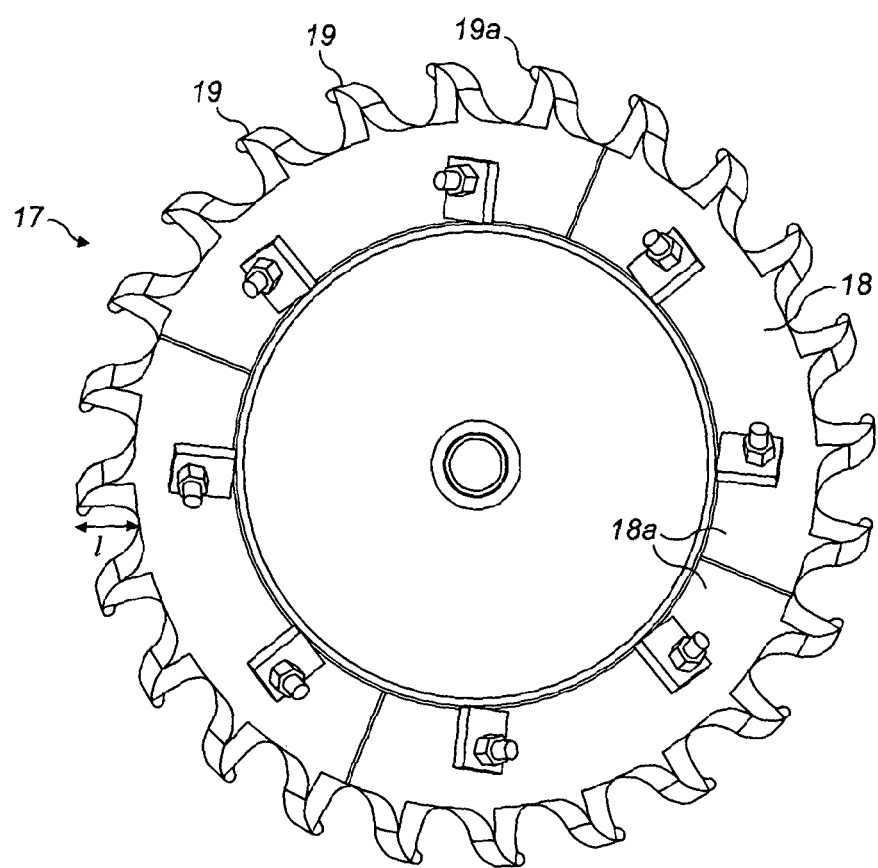
FIG. 3 is an end-on view of a rotor adapted to carry out the method of the invention.

The treatment method comprises lifting thatch, natural grass 12 and matrix 15, 16 with a horizontal rotor 17, FIGS. 3, 4, 5, traversed and rotated over the turf 11 and having helical blades 18 having teeth 19, in which the teeth 19 extend a depth d below the turf level 14, so that the blades move through the turf 11 pulling out thatch, natural grass 12 and matrix material.

Usually, a treatment to a depth d at which at least some natural grass, roots, crowns, rhizomes, perhaps some culm, is left in the matrix will suffice, and the grass will grow back. However, when the matrix is badly infected with algae, all the natural grass may be removed by driving the blading sufficiently deep, and new matrix laid down and reseeded. So long as, when treating reinforced turf, the depth d is less than the depth of any backing such as disclosed in U.S. Pat. No. 5,489,317 or U.S. Pat. No. 6,094,860, and, in particular with the Desso Grassmaster® system, which does not have a backing, the depth to which the artificial fibres are injected, any artificial grass will remain in place.

The teeth 19 extend below turf level 14, and may have a length l of 50 mm or more. The teeth 19 are on blade segments 18a that are bolted to the rotor 17. The blade segments 18a are fashioned from steel or like hard, rigid and wear resistant material, typically 10 mm thick.

The depth d to which the teeth 19 are required to penetrate may be determined by core sampling the matrix, or estimated by the skilled greenkeeper from knowledge and experience.

Figure 6:
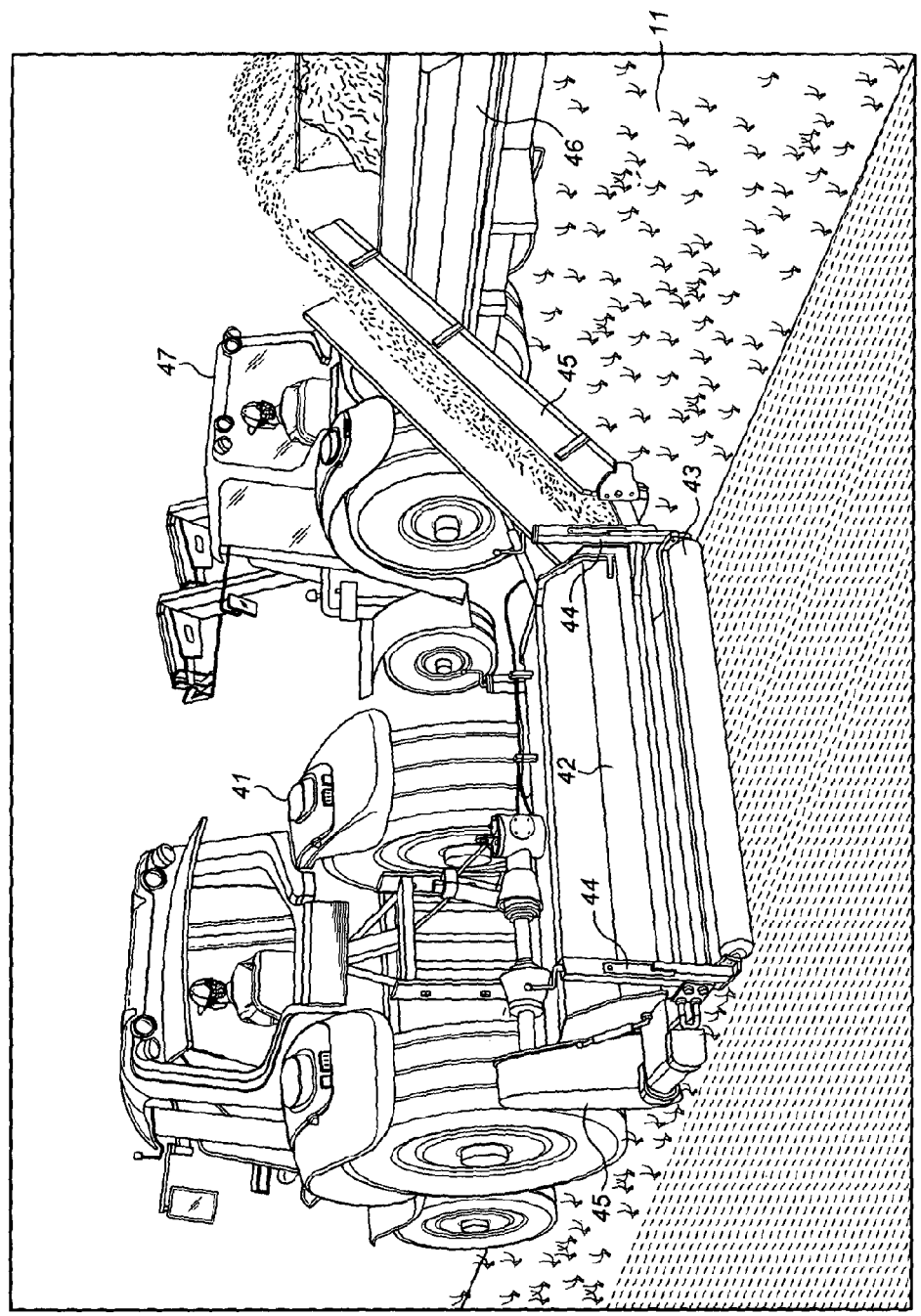
FIG. 6 is a rear view of a rotor in use.

The rotor 17 is mounted on a tractor 41, FIG. 6, carrying the rotor 17 in a chassis 42 with a ground roller 43 and a blade height control arrangement 44 adapted to deploy the teeth 19 below turf level 14. The tractor 41 is driven to traverse the rotor 17 over the turf so deployed and has a power take-off transmission 45 to rotate the rotor 17 so that the blades 19 move through the turf 11 pulling out thatch, natural grass 12 and matrix material, soil and/or sand. The rotor is driven so that the hooks 19 drive into the turf as it moves forward. The material lifted from the turf is driven to the right of the tractor 41 by the action of the helical blading and is lifted on an elevator 45 into a trailer 46 drawn behind a second tractor 47.

The height control arrangement 44 is adapted to extend the blades 19 as deep as may be desired into the soil 16.

The blades 18 have a saw tooth profile, with the saw teeth 19 inclined to the direction of motion, the teeth being so dimensioned that the anchored artificial turf is deflected by passage of the tooth, and then springs back, without being removed or damaged. The teeth 19 have tips 19a reinforced against wear with, for example, tungsten or other carbide, and are hooked in shape. The tips 19a are configured to be square on to the direction (arrow A, FIG. 5) at which the tips enter the turf Teeth 19 are typically 35 mm from tip to root (T in FIG. 5).

Figure 4:
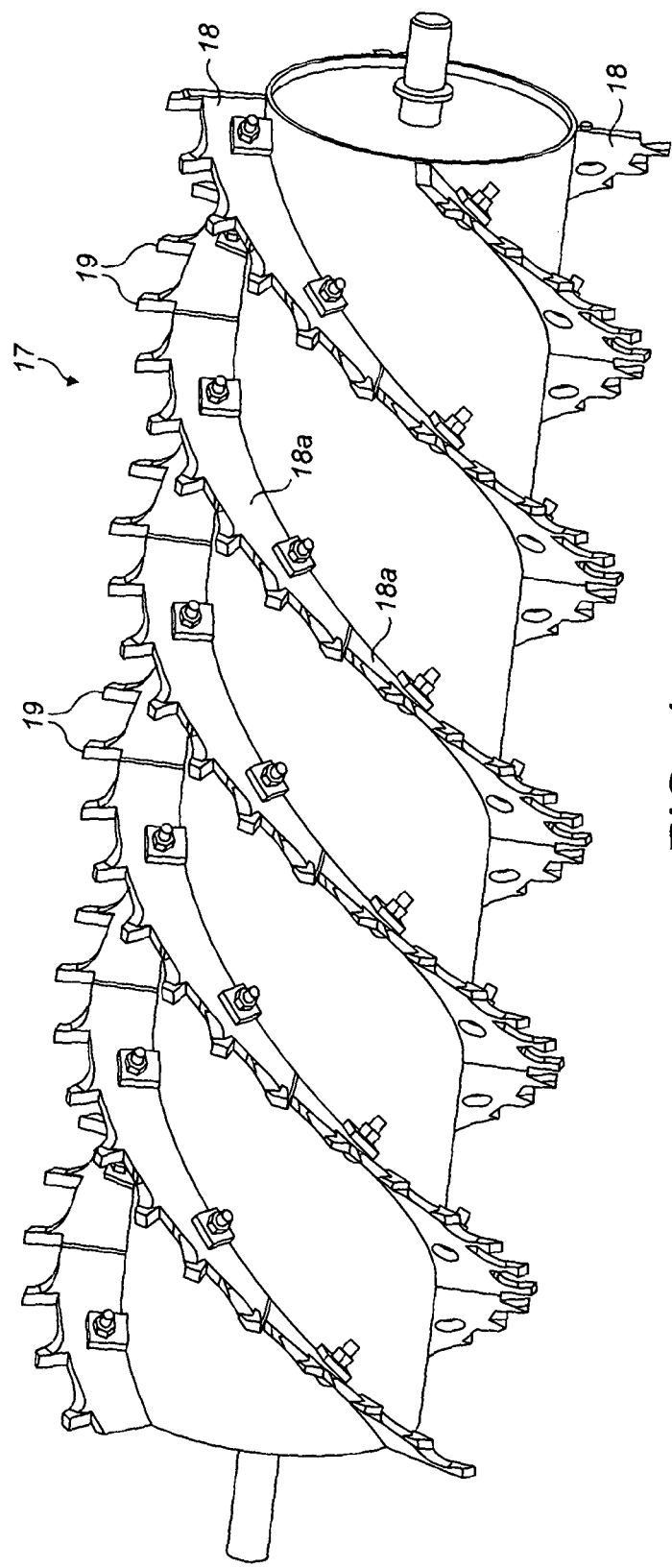
FIG. 4 is a front view of the rotor of FIG. 3.
Figure 5:
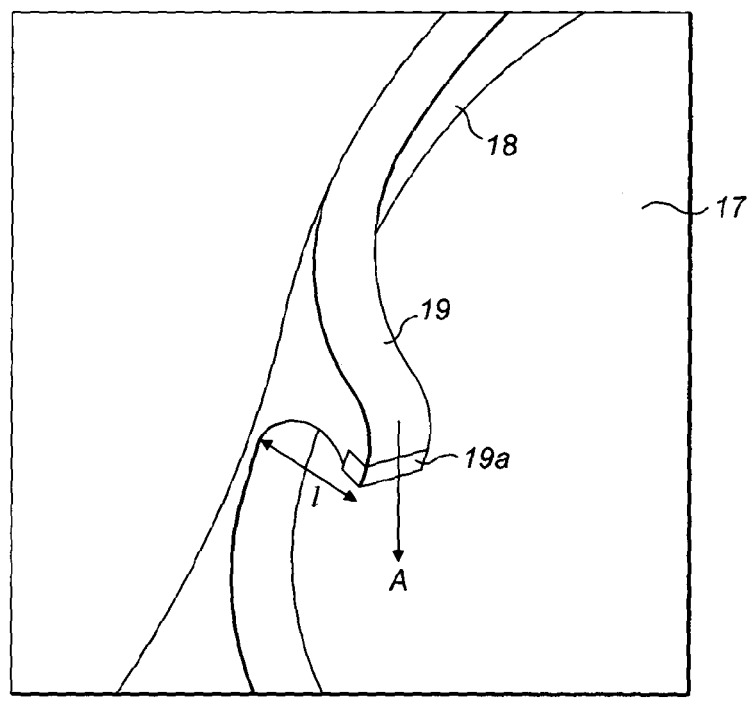
FIG. 5 is a close-up view of a tooth of blading of the rotor of FIG. 3.

There may be any number of helical blades 18; four are illustrated in FIG. 4. There may be three, for example, but if there are four, two of them may be removed to reconfigure the rotor without unbalancing it. Such reconfiguration may be desirable to give more or less intensive treatment, or, for example, to leave furrows in the surface into which treatment media may be introduced, such as disinfectant, weed treatment, fertiliser and so forth, before backfilling with fresh matrix and perhaps reseeding.

Treatment can, as described, be carried out using equipment attached as an implement on tractors conventionally used for turf treatment, yet can selectively remove the top surface of turf evenly, ready for resurfacing without requiring the use of heavy ploughs and graders. A rotor as described can treat a football pitch, with one or at most two passes, in a single day, leaving the surface ready for reseeding.

The invention claimed is:

1. A method for treating turf comprising grass growing in a matrix consisting of at least one of sand and humus, and which is infected with at least one of thatch, alga, moss, fungi and slime mould, the method for treating turf comprising:
   providing a cylindrical rotor having a cylindrical axis and having a given length and circumference disposed for rotation about the cylindrical rotors cylindrical axis with said cylindrical axis being horizontal;
   the cylindrical rotor being provided with blading having teeth disposed around the cylindrical rotor such that there is no part of the given length of the cylindrical rotor that does not have at least one tooth at some part of the cylindrical rotors circumference;
   providing means to rotate and traverse the cylindrical rotor over the turf at a given rate of rotation and a given speed of traverse so that the teeth drive into the matrix to a given depth therein to remove infected matrix;
   the given rate of rotation and the given speed of traverse being selected such that no part of the turf traversed by the rotor is left untreated.

2. A method according to claim 1, in which the given depth is such that the grass growing in the turf is removed.

3. A method according to claims 2, in which matrix material is applied to the turf after treatment, and the turf is then reseeded.

4. A method according to claim 1, adapted for treating turf reinforced with artificial grass, in which the given depth is above that at which artificial grass would be removed by the blading.

5. A method according to claim 1, in which the blading is angled with respect to the cylindrical axis of the cylindrical rotor.

6. A method according to claim 1, in which the teeth have a thickness of from 5 mm to 10 mm.

7. A method according to claim 1, in which the cylindrical rotor is rotated so that the blading moves forwardly through the matrix.

8. A method according to claim 1, in which the blading is in the form of hooked teeth, the hooked teeth comprising hooks facing in a direction of travel.

9. A method according to claim 1, in which the thatch and the matrix are removed to a predetermined depth above that at which grass roots are found.

* * * * *